2,711,352

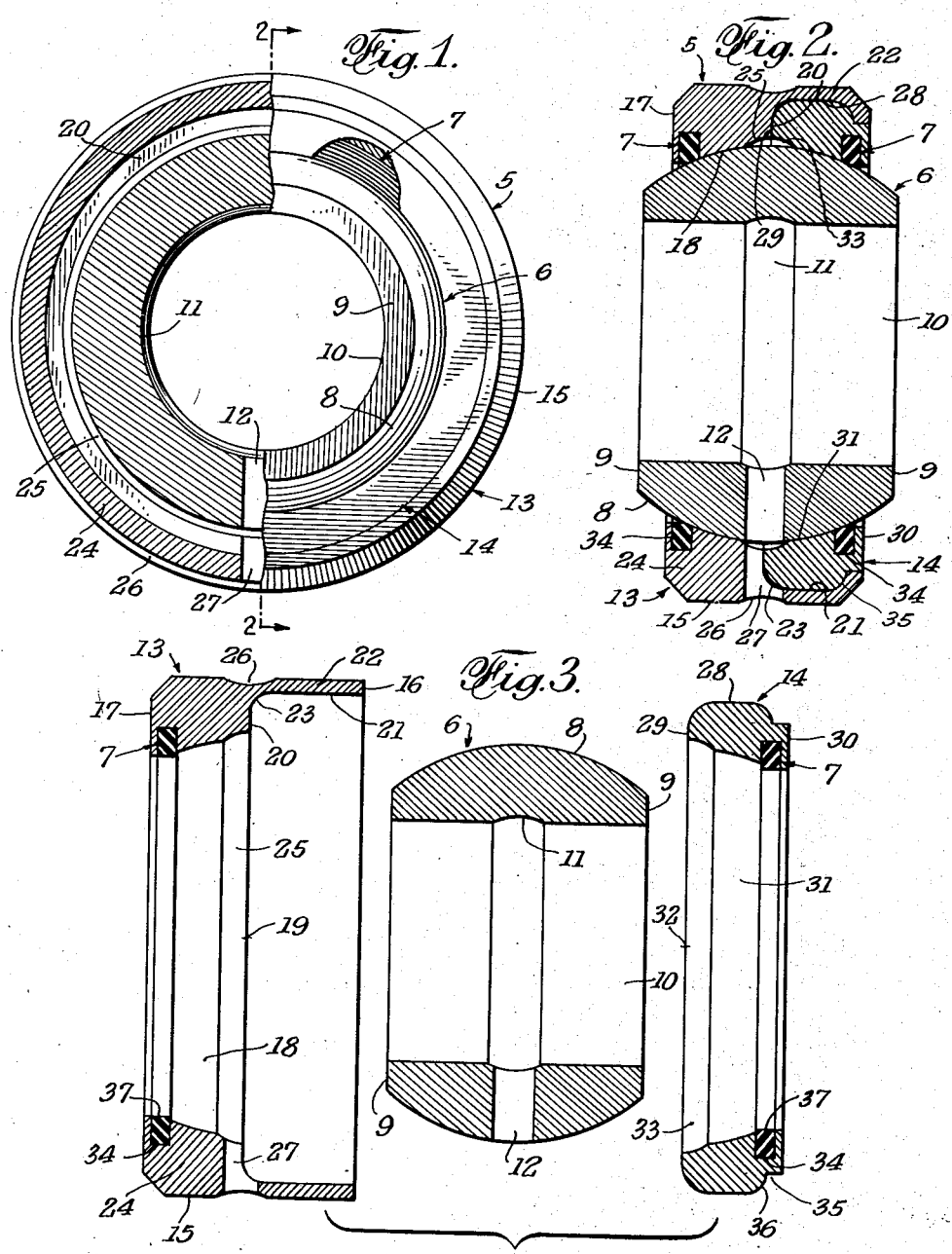
June 21, 1955  J. HASKO ET AL  2,711,352
SPHERICAL BEARING
Filed Nov. 1, 1952
Inventors
JOHN HASKO
JAMES C. PEACOCK
By C. G. Stratton
Attorney United States Patent Office 2,711,352
Patented June 21, 1955

SPHERICAL BEARING

John Hasko, Compton, and James C. Peacock, Whittier, Calif.

Application November 1, 1952, Serial No. 318,256

2 Claims. (Cl. 308—72)

This invention relates to spherical bearing construction. Spherical bearings essentially comprise a race having a spherical seat, and a ball in said seat having self-aligning spherical bearing in said seat. The ball has a bore or passage for a shaft or stud. Since the seat in the race has a smaller diametral size at its ends than the diameter of the ball, interfitting of race and ball entails a swaging operation. Heretofore, such an operation entailed either swaging the race around the ball or swaging the race around annular inserts interposed between the race and the ball. In either case, the swaging of the race creates forces on the ball that affect the accuracy of interfit of race and ball. Also, because of the displacement by swaging of a substantial areal portion of the spherical seat, a desired full contact of ball and seat is frequently not obtained but rather point or line contacts that induce increased wear and hasten the loss of accuracy of fit.

Because, in prior structures, substantial portions of the race are formed by swaging around the ball, the hardness, and, therefore, the tensile strength of the material from which the race is formed, is necessarily lower than if assembly were possible without such swaging. The bearings, therefore, have poorer wear properties than they would have with races that are harder.

Recognizing the above faults in prior spherical bearings, it is the objects of the present invention to provide a race particularly adapted to be formed of high hardness metal, to provide a race in which the initial size and form of the spherical seat is accurately retained after assembly with the ball, and to provide a more accurate and longer wearing bearing by insurance of uniform contact of ball and seat after assembly.

Another object of the invention is to obviate a swaging operation in which the race seat is forced into conformance with the ball and, to this end, to provide a two-part race in which each part has half the seat formed therein and said two parts are permanently secured together in accurate cooperation with the ball.

Since spherical bearings embody means to provide lubrication between the race seats and the ball and it is desired to retain such lubrication within the confines of the bearing and, at the same time, to seal the bearing surfaces against dirt and dust, it is another object of the invention to provide novel means, carried by each race part, to effect efficient sealing of the seat and ball contact areas.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention which is given by way of illustration or example only.

In the drawing, like reference characters designate similar parts in the several views.

Fig. 1 is a side elevational view, partly in section, of a spherical bearing according to the present invention.

Fig. 2 is a cross-sectional view as taken on line 2—2 of Fig. 1.

Fig. 3 is a similar view of the components of the bearing before assembly thereof.

The present spherical bearing comprises, generally, a race 5, a ball 6 universally movable within said race, and sealing means 7 on opposite sides of the race to seal the bearing therebetween.

The ball 6 that is shown is generally conventional and the novelty in the present structure resides in the construction and arrangement of the race 5 and sealing means 7.

The ball 6 is usually formed of steel or other metal of high hardness and tensile strength. The same is machined, ground, or otherwise formed to have a spherical surface 8 between parallel flat sides 9, a bore or passage 10 adapted to receive a rod, shaft or the like, an annular groove 11 midway of the bore 10, and at least one hole 12 extending from surface 8 through to the groove 11. Formed in this manner, the ball has the shape of a cask and the same may be modified by providing necks in the form of lateral extensions of sides 9. In practice, chromium plating may be applied to spherical surface 8 to increase the hardness thereof and to enable the provision of a high polish thereon. Also, the diametral size of surface 8 is held to tolerances of +.0000 and —.0002 inch.

According to the invention, race 5 comprises an outer race part 13 and an inner race part 14 both formed of a high tensile steel as, for instance, chrome vanadium steel, and, therefore, having high resistance to wear as does the above-described ball 6.

The outer race part 13 is formed as an annulus having an outer cylindrical face 15 between side faces 16 and 17. Internally, one side of said annulus is provided with a spherical seat portion 18, the center of generation of which is on a point 19 located in the plane of a shoulder wall 20. Said shoulder wall comprises the bottom of a cylindrical bore 21 that opens on side face 16 and defines, with cylindrical face 15, a relatively thin annulus 22. In practice, a radial fillet 23 is provided where shoulder wall 20 joins cylindrical bore 21.

The spherical seat portion 18 is formed in the remaining thicker portion 24 of race part 13 and the diametral size of said seat portion is made to be the same as the spherical surface 8 of the ball except that the tolerances are reversed to insure a maximum variation of fit between said ball and seat portion of some .0004 inch. Adjacent wall 20, seat portion 18 is relieved by an annular groove 25 which, except for its larger diametral size, is similar to one-half of groove 11. Adjacent side face 17, the portion 24 of race part 13 is provided with a rectangular-sectioned groove 26 to receive and non-displaceably hold sealing means 7. In centered alignment with shoulder wall 20, cylindrical surface 15 is relieved by an outer annular groove 26 and at least one hole 27 connects grooves 25 and 26.

As stated, the material of part 13 is hard to provide surface 18 with desired wear-resistant properties. As will later be described, annulus 22 is folded over race part 14 during assembly of the bearing. In order that said annulus have suitable malleability for such folding, the same, from approximately the shoulder wall 20, is subjected to an induction draw to reduce the Rockwell hardness of the metal of said annulus. In this manner, the side of said part 13 that has seat part 18 remains hard, while annulus 22 is materially less hard and is adapted to be folded.

The inner race part 14 is formed as an annulus having an outer cylindrical face 28 between side faces 29 and 30. Internally, said part 14 is formed with a spherical seat portion 31 that is the complement of seat portion 18 and which is generated on a point 32 in the plane of face 29, with an annular groove 33 that is a complement of groove 25, and with a rectangular-sectioned groove 34 identical to groove 34 in part 13.

Cylindrical face 28 has an exact fit, with suitable minimum tolerances, in bore 21. When shoulder wall 20 and face 28 are in abutment, points 19 and 32 coincide and the point of coincidence, therefore, is the center of generation of spherical seat 18, 31.

In practice, an annular outer rabbet 35 is provided on the side of part 14 that is adjacent to side face 30, the cylindrical face 28 blending into said rabbet on a curve 36 comparable to the curvature of fillet 23.

The sealing means 7 comprises rectangular-sectioned rubber or synthetic rubber rings that are fitted into grooves 34 and have inner faces 37 inward of seat faces 18 and 31, as best seen in Fig. 3.

The bearing is assembled by inserting ball 6 into race part 13 and in engagement with seat part 18. Then race part 14 is inserted into bore 21 with side face 29 against shoulder wall 20. Thereafter, the outer portion of the relatively softer annulus 22 is folded inwardly into rabbet 35, and, finally, the folded side of the assembly is finished off by grinding or the like to be similar to the opposite side. Fig. 2 shows the finished bearing.

It will be evident that ball 6 has accurate fit in the spherical seat of the two-part race; that sealing rings 7 effectively seal against dirt and confine lubricant introduced into the bearing by way of grooves 26, 25 and hole or holes 27; and that the folding operation is of such nature that the race parts 13 and 14, and particularly the latter, are not stressed and, therefore, not distorted or deformed from their normal condition.

Since the race seat, as indicated, is not deformed, the ball has uniform surface contact therewith. Therefore, the bearing is usable as assembled and does not require normalizing or stress-relieving operations, as are necessary in bearings produced according to prior methods.

While we have illustrated and described what we now contemplate to be the best mode of carrying out our invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what we claim and desire to secure by Letters Patent is:

1. In a bearing an outer bearing raceway for seating a ball for universal movement, a ball member, said bearing raceway including a first bearing part having a thick annular body portion provided with an annular face and an annular laterally projecting flange extending from a lateral outer marginal edge portion thereof, said first part having an arcuate annular bearing surface on its inner face, a second complementary bearing part for association with said first bearing part including a heavy body portion of annular form for snugly seating against the inner face of the first bearing part and its flange, said second part having a reduced projection defining a shoulder against which the peripheral edge of the laterally projecting annular flange of the first part is seated, the body portion of the second complementary part of the bearing raceway being provided with an annular inner bearing face of arcuate cross section, the outer face of the first raceway part at substantially the junction of its body and its flange being formed with an annular recess for restricting the thickness of the flange wall at its point of connection with the body, and said ball being received within the raceway on the annular inner bearing faces thereof.

2. The structure of claim 1 characterized in that the ball is formed with an annular oil recess and said recess communicates with the annular recess of the junction of the body and wall of the first part by a radial port defined by the adjacent walls of the two parts.

References Cited in the file of this patent

UNITED STATES PATENTS

| 2,047,885 | Riebe | July 14, 1936 |
| 2,322,004 | Fast | June 15, 1943 |
| 2,488,775 | Heim | Nov. 22, 1949 |
| 2,614,898 | Adams | Oct. 21, 1952 |

FOREIGN PATENTS

| 192,288 | Great Britain | Feb. 1, 1923 |
| 425,749 | Italy | Oct. 13, 1947 |